(12) United States Patent
Stiebels et al.

(10) Patent No.: US 9,352,307 B2
(45) Date of Patent: May 31, 2016

(54) CU-CHA/FE-MFI MIXED ZEOLITE CATALYST AND PROCESS FOR THE TREATMENT OF NO$_x$ IN GAS STREAMS

(75) Inventors: Susanne Stiebels, Adenbuttel (DE);
Claudia Wendt, Hannover (DE);
Torsten Neubauer, Langenhagen (DE);
Martin Dieterle, Ludwigshafen (DE);
Jaya L. Mohanan, Edison, NJ (US)

(73) Assignee: BASF Corporation, Florham Park, NJ (US)

(*) Notice: Subject to any disclaimer, the term of this patent is extended or adjusted under 35 U.S.C. 154(b) by 669 days.

(21) Appl. No.: 13/082,907

(22) Filed: Apr. 8, 2011

(65) Prior Publication Data

US 2011/0305614 A1    Dec. 15, 2011

Related U.S. Application Data

(60) Provisional application No. 61/321,907, filed on Apr. 8, 2010.

(51) Int. Cl.
| | | |
|---|---|---|
| *B01J 29/06* | (2006.01) | |
| *B01D 53/94* | (2006.01) | |
| *B01J 29/80* | (2006.01) | |
| *B01J 37/02* | (2006.01) | |
| *B01D 53/86* | (2006.01) | |
| *B01J 29/46* | (2006.01) | |
| *B01J 29/76* | (2006.01) | |

(52) U.S. Cl.
CPC .............. *B01J 29/80* (2013.01); *B01D 53/9418* (2013.01); *B01J 37/0246* (2013.01); *B01D 53/8628* (2013.01); *B01D 53/9463* (2013.01); *B01D 53/9468* (2013.01); *B01D 53/9472* (2013.01); *B01D 53/9477* (2013.01); *B01D 2255/20738* (2013.01); *B01D 2255/20761* (2013.01); *B01D 2255/50* (2013.01); *B01D 2255/504* (2013.01); *B01D 2255/902* (2013.01); *B01D 2255/9022* (2013.01); *B01D 2258/012* (2013.01); *B01J 29/46* (2013.01); *B01J 29/763* (2013.01)

(58) Field of Classification Search
USPC ........ 502/64, 66, 67, 69, 71, 74, 77; 422/177; 60/297, 299; 423/213.2, 213.5, 239.2
See application file for complete search history.

(56) References Cited

U.S. PATENT DOCUMENTS

| | | | |
|---|---|---|---|
| 6,345,496 B1 | 2/2002 | Fuwa et al. | |
| 6,843,971 B2 | 1/2005 | Schafer-Sindlinger et al. | |
| 7,332,148 B2 | 2/2008 | Tran et al. | |
| 8,126,642 B2 | 2/2012 | Trepagnier et al. | |
| 2003/0143141 A1* | 7/2003 | Schwefer et al. | 423/235 |
| 2009/0048095 A1 | 2/2009 | Li et al. | |
| 2010/0058746 A1 | 3/2010 | Pfeifer et al. | |
| 2010/0222205 A1* | 9/2010 | Ogunwumi et al. | 502/68 |
| 2011/0116983 A1* | 5/2011 | Kunieda et al. | 422/177 |

FOREIGN PATENT DOCUMENTS

| | | |
|---|---|---|
| CN | 1980726 | 6/2007 |
| CN | 101668589 | 3/2010 |
| EP | 2123614 | 11/2009 |
| EP | 2324905 | 5/2011 |
| JP | 2012-507088 | 3/2012 |
| WO | WO-99/39809 | 8/1999 |
| WO | WO-00/72965 | 12/2000 |
| WO | WO-2005/060446 | 7/2005 |
| WO | WO-2008/021602 | 1/2008 |
| WO | 2008/083126 | * 7/2008 |
| WO | WO-2008/106519 | 9/2008 |
| WO | 2008/132452 | * 11/2008 |
| WO | 2009/023202 | * 2/2009 |
| WO | WO-2009/099937 | 8/2009 |
| WO | WO-2011/064666 | 6/2011 |

OTHER PUBLICATIONS

Girard et al., "Combined Fe—Cu SCR Systems with Optimized Ammonia to NOx Ratio for Diesel NOx Control", SAE International, pp. 523-530, 2008.*
"IPRP in PCT/IB2011/051524", dated Oct. 9, 2012, 7 pgs.
PCT International Search Report in PCT/IB2011/051524, mailed Sep. 1, 2011, 4 pgs.
Extended European Search Report in EP11765157.0, dated Nov. 10, 2014, 6 pages.
Girard, James, et al., Combined Fe—Cu SCR Systems with Optimized Ammonia to NOx Ratio for Diesel NOx Control, *SAE Int. J. Fuels Lubr.* vol. 1, Issue 1 2008, 603-610.
Krocher, Oliver, et al., Combination of V2O5/WO3-TiO2, Fe-ZSM5, and Cu-ZSM5 Catalysts for the Selective Catalytic Reduction of Nitric Oxide with Ammonia, *Ind. Eng. Chem. Res.* vol. 47 2008, 8588-8593.
Kwak, Ja Hun, et al., Excellent activity and selectivity of Cu-SSZ-13 in the selective catalytic reduction of NOx with NH3, *Journal of Catalysis* vol. 275 2010, 187-190.
Metkar, Pranit, S., et al., Selective catalytic reduction of NOx on combined Fe and Cu-zeolite monolithic catalysts: Sequential and dual layer configurations, *Applied Catalysis B: Environmental* vol. 111-112 2012, 67-80.

* cited by examiner

*Primary Examiner* — Elizabeth Wood
(74) *Attorney, Agent, or Firm* — Womble Carlyle Sandridge & Rice, LLP

(57) ABSTRACT

Described is a catalyst, preferably for use in selective catalytic reduction (SCR), said catalyst comprising one or more zeolites of the MFI structure type, and one or more zeolites of the CHA structure type, wherein at least part of the one or more zeolites of the MFI structure type contain iron (Fe), and wherein at least part of the one or more zeolites of the CHA structure type contain copper (Cu). An exhaust gas treatment system is described, comprising said catalyst as well as a process for the treatment of a gas stream comprising NO$_x$ using said catalyst as well.

15 Claims, 2 Drawing Sheets

＃ CU-CHA/FE-MFI MIXED ZEOLITE CATALYST AND PROCESS FOR THE TREATMENT OF $NO_x$ IN GAS STREAMS

CROSS-REFERENCE TO RELATED APPLICATIONS

This application claims the benefit of priority under 35 U.S.C. §119(e) to U.S. Patent Application No. 61/321,907, filed Apr. 8, 2010, which is hereby incorporated by reference in its entirety.

TECHNICAL FIELD

The present invention relates to a catalyst which is preferably for use in selective catalytic reduction (SCR), as well as to an exhaust gas treatment system comprising said catalyst, and to a process for the treatment of a gas stream comprising $NO_x$. In particular, the present invention is concerned with a method of catalyzing the reduction of nitrogen oxides, and especially with the selective reduction of nitrogen oxides with ammonia in the presence of oxygen, using metal-promoted zeolite catalysts.

BACKGROUND

The emissions present in the exhaust gas of a motor vehicle can be divided into two groups. Thus, the term "primary emission" refers to pollutant gases which form directly through the combustion process of the fuel in the engine and are already present in the untreated emission before it passes through an exhaust gas treatment system. Secondary emission refers to those pollutant gases which can form as by-products in the exhaust gas treatment system.

The exhaust gas of lean engines comprises, as well as the customary primary emissions of carbon monoxide CO, hydrocarbons HC and nitrogen oxides $NO_x$, a relatively high oxygen content of up to 15% by volume. In the case of diesel engines, there is additional particulate emission in addition to the gaseous primary emissions, which consists predominantly of soot residues, with or without organic agglomerates, and originates from partially incomplete fuel combustion in the cylinder.

In diesel engine applications, the use of specific diesel particulate filters is unavoidable for the removal of the particulate emissions. Furthermore, complying with the emissions limits prescribed by legislation in Europe and the United States requires nitrogen oxide removal from the exhaust gas ("denitrification"). Thus, although carbon monoxide and hydrocarbon pollutant gases from the lean exhaust gas can easily be rendered harmless by oxidation over a suitable oxidation catalyst, the reduction of the nitrogen oxides to nitrogen is much more difficult owing to the high oxygen content of the exhaust gas stream.

Known methods for removing nitrogen oxides from exhaust gases are firstly methods using nitrogen oxide storage catalysts (NSCs) and secondly methods for selective catalytic reduction (SCR) by means of ammonia over a suitable catalyst, SCR catalyst for short.

The cleaning action of nitrogen oxide storage catalysts is based on the nitrogen oxides being stored in a lean operating phase of the engine by the storage material of the storage catalyst, predominantly in the form of nitrates. When the storage capacity of the NSC is exhausted, the catalyst has to be regenerated in a subsequent rich operating phase of the engine. This means that the nitrates formed beforehand are decomposed and the nitrogen oxides released again are reacted with the reducing exhaust gas components over the storage catalyst to give nitrogen, carbon dioxide and water.

Since the implementation of a rich operating phase in diesel engines is not straightforward and the establishment of the rich exhaust gas conditions required for regeneration of the NSC frequently entails auxiliary measures such as fuel postinjection into the exhaust gas line, the alternative SCR method is preferably used for denitrification of diesel motor vehicle exhaust gases. In this method, according to the engine design and construction of the exhaust gas system, a distinction is made between "active" and "passive" SCR methods, "passive" SCR methods involving use of ammonia secondary emissions generated deliberately in the exhaust gas system as a reducing agent for denitrification.

For example, U.S. Pat. No. 6,345,496 B1 describes a method for cleaning engine exhaust gases, in which repeatedly alternating lean and rich air/fuel mixtures are established and the exhaust gas thus produced is passed through an exhaust gas system which comprises, on the inflow side, a catalyst which converts $NO_x$ to $NH_3$ only under rich exhaust gas conditions, while a further catalyst arranged on the outflow side adsorbs or stores $NO_x$ in the lean exhaust gas, and releases it under rich conditions, such that it can react with $NH_3$ generated by the inflow-side catalyst to give nitrogen. As an alternative, according to U.S. Pat. No. 6,345,496 B1, an $NH_3$ adsorption and oxidation catalyst may be arranged on the outflow side, which stores $NH_3$ under rich conditions, desorbs it under lean conditions and oxidizes it with oxygen to give nitrogen and water. Further disclosures of such methods are known. Like the use of the nitrogen oxide storage catalysts, however, such "passive" SCR methods have the disadvantage that one of their essential constituents is the provision of rich exhaust gas conditions, which are generally required for in situ generation of ammonia as a reducing agent.

Compared to this, in "active" SCR methods, the reducing agent is metered into the exhaust gas line from an addition tank carried in the vehicle by means of an injection nozzle. Such a reducing agent used may, apart from ammonia, also be a compound readily decomposable to ammonia, for example urea or ammonium carbamate. Ammonia has to be supplied to the exhaust gas at least in a stoichiometric ratio relative to the nitrogen oxides. Owing to the greatly varying operation conditions of the motor vehicles, the exact metered addition of the ammonia is not straightforward. This leads in some cases to considerable ammonia breakthroughs downstream of the SCR catalyst. To prevent secondary ammonia emission, an oxidation catalyst is usually arranged downstream of the SCR catalyst, which is intended to oxidize ammonia which breaks through to nitrogen. Such a catalyst is referred to hereinafter as an ammonia slip catalyst.

To remove particulate emissions from the exhaust gas of diesel motor vehicles, specific diesel particulate filters are used, which may be provided with an oxidation catalyst-containing coating to improve their properties. Such a coating serves to lower the activation energy for oxygen-based particulate burnoff (soot combustion) and hence to lower the soot ignition temperature on the filter, to improve the passive regeneration performance by oxidation of nitrogen monoxide present in the exhaust gas to nitrogen dioxide, and to suppress breakthroughs of hydrocarbon and carbon monoxide emissions.

If compliance with legal emissions standards requires both denitrification and removal of particulates from the exhaust gas of diesel motor vehicles, the described measures for removing individual pollutant gases are combined in a corresponding conventional exhaust gas system by connection in series. For example, WO 99/39809 describes an exhaust after treatment system wherein an oxidation catalyst for oxidation of NO in $NO_x$ to $NO_2$, a particulate filter, a metering unit for a reducing agent and an SCR catalyst follow on each other. To prevent ammonia breakthroughs, an additional ammonia slip catalyst is generally required downstream of the SCR catalyst, and continues the series of catalysts on the outflow side of the SCR catalyst.

In this respect, both synthetic and natural zeolites and their use in promoting certain reactions, including the selective reduction of nitrogen oxides with ammonia in the presence of oxygen, are well known in the art. Zeolites are aluminosilicate crystalline materials having rather uniform pore sizes which, depending upon the type of zeolite and the type and amount of cations included in the zeolite lattice, may range from about 3 to 10 angstroms in diameter.

EP 1 961 933 A1, for example, relates to a diesel particulate filter for treating exhaust gas comprising a filter body having provided thereon an oxidation catalyst coating, an SCR-active coating, and an ammonia storage material. Among the materials which may be used as the catalytically active component in the SCR reaction, said document mentions the use of zeolites selected from beta zeolite, Y-zeolite, faujasite, mordenite and ZSM-5 which may be exchanged with iron or copper.

EP 1 147 801 A1, on the other hand, relates to a process for reducing nitrogen oxides present in a lean exhaust gas from an internal combustion engine by SCR using ammonia, wherein the reduction catalyst preferably contains ZSM-5 zeolite exchanged with copper or iron. Said document further concerns an SCR catalyst having a honeycomb substrate and deposited thereon a coating containing ZSM-5 zeolite exchanged with iron.

EP 2 123 614 A2 for its part concerns a honeycomb structure containing zeolites and an inorganic binder. In particular, a first zeolite included in said structure is ion-exchange with a metal including Cu, Mn, Ag, and V, and a second zeolite is further included which is exchanged with a metal including Fe, Ti, and Co. Regarding the types of zeolites used for the first and second zeolite, these include zeolite beta, zeolite Y, ferrierite, ZSM-5 zeolite, mordenite, faujasite, zeolite A, and zeolite L.

U.S. Pat. No. 7,332,148 B2 describes a stabilized aluminosilicate zeolite containing copper or iron, wherein the stabilized zeolite includes ZSM-5, ZSM-8, ZSM-11, ZSM-12, zeolite X, zeolite Y, zeolite beta, mordenite, and erionite.

Finally, WO 2008/106519 A1 describes a zeolite having the CHA crystal structure and containing copper. Said document also discusses the use of such an ion-exchanged zeolite as an SCR catalyst.

Accordingly, the prior art relates an awareness of the utility of metal-promoted zeolite catalysts including, among others, iron-promoted and copper-promoted zeolite catalysts, in particular for the selective catalytic reduction of nitrogen oxides with ammonia.

Presently, however, increasingly strict legislature with respect to emissions, and in particular regarding motor vehicle exhaust gas emissions, requires improved catalysts and exhaust treatment systems using such catalysts for the treatment thereof. Thus, exhaust gas emission legislation in the European Union for exhaust gas emission stage Euro 6 now requires reduction of $NO_x$ emissions for most passenger cars powered by diesel engines. For this purpose, exhaust gas emissions are tested using the New European Driving Cycle (NEDC), also referred to as the MVEG (Motor Vehicle Emissions Group) cycle, which is laid down in European Union Directive 70/220/EEC. One way of meeting this requirement includes the application of SCR catalyst technology to the exhaust gas systems of the vehicles in question.

As opposed to the old European driving cycle (ECE-15) driving cycle, a particular feature of the NEDC is that it integrates a so-called extra-urban driving cycle, such that testing may better represent the typical usage of a car in Europe, and, accordingly, the typical emission pattern linked thereto. More specifically, in the NEDC, the old European driving cycle ECE-15 is performed in the time period of 0 to 800 seconds, after which the extra-urban driving cycle is conducted in the time period up to 1200 seconds.

It would be desirable to provide an improved catalyst, in particular for use in selective catalytic reduction, wherein said catalyst is, for example, better adapted to the actual emission conditions encountered in motor vehicle use, such as for example those encountered in the NEDC.

SUMMARY

The present invention includes the following embodiments, wherein these include the specific combinations of embodiments as indicated by the respective interdependencies defined therein:

1. A catalyst, preferably for use in selective catalytic reduction (SCR), said catalyst comprising
   one or more zeolites of the MFI structure type, and
   one or more zeolites of the CHA structure type,
   wherein at least part of the one or more zeolites of the MFI structure type contain iron (Fe), and wherein at least part of the one or more zeolites of the CHA structure type contain copper (Cu).
2. The catalyst of embodiment 1, wherein the weight ratio of the one or more zeolites of the MFI structure type relative to the one or more zeolites of the CHA structure type ranges from 1:10 to 10:1, preferably from 1:5 to 5:1, more preferably form 1:2 to 2:1, more preferably from 0.7:1 to 1:0.7, more preferably from 0.8:1 to 1:0.8, and even more preferably from 0.9:1 to 1:0.9.
3. The catalyst of embodiment 1 or 2, wherein one or more of the zeolites, and preferably all of the zeolites, comprise both Al and Si in their respective zeolite frameworks.
4. The catalyst of embodiment 3, wherein the molar ratio of silica to alumina (SAR) in the one or more zeolites of the MFI structure type ranges from 5 to 150, preferably from 15 to 100, more preferably from 20 to 50, more preferably from 23 to 30, and even more preferably from 25 to 27.
5. The catalyst of embodiment 3 or 4, wherein the molar ratio of silica to alumina (SAR) in the one or more zeolites of the CHA structure type ranges from 5 to 100, preferably from 10 to 70, more preferably from 20 to 55, more preferably from 25 to 35, and even more preferably from 28 to 32.
6. The catalyst of any of embodiments 1 to 5, wherein the amount of Fe in the one or more zeolites of the MFI structure type ranges from 0.1 to 15 wt.-% based on the weight of said one or more zeolites, wherein preferably the amount of Fe ranges from 0.5 to 10 wt.-%, more preferably from 1.0 to 7.0 wt.-%, more preferably from 2.5 to 5.5 wt.-%, more preferably from 3.5 to 4.2 wt.-%, and even more preferably from 3.7 to 4.0 wt.-%.
7. The catalyst of any of embodiments 1 to 6, wherein the amount of Cu in the one or more zeolites of the CHA structure type ranges from 0.05 to 15 wt.-% based on the weight of said one or more zeolites, wherein preferably the amount of Cu ranges from 0.1 to 10 wt.-%, more preferably from 0.5 to 5.0 wt.-%, more preferably from 1.0 to 4.0 wt.-%, more preferably from 1.6 to 3.4 wt.-%, and even more preferably from 1.8 to 3.2 wt.-%.

8. The catalyst of any of embodiments 1 to 7, wherein said catalyst further comprises a substrate, preferably a honeycomb substrate, onto which the one or more zeolites are provided.
9. The catalyst of embodiment 8 wherein the substrate is selected from the group consisting of flow-through substrates and wall-flow substrates, preferably from the group consisting of cordierite flow-through substrates and wall-flow substrates, and silicon carbide flow-through substrates and wall-flow substrates.
10. The catalyst of embodiment 8 or 9, wherein the catalyst comprises one or more layers, preferably washcoat layers, provided on the substrate, the zeolites being contained in one single layer or two or more separate layers, wherein preferably the zeolites are contained in one single layer.
11. The catalyst of any of embodiments 1 to 10, wherein either the one or more zeolites of the MFI structure type, or the one or more zeolites of the CHA structure type, or both the one or more zeolites of the MFI structure type and the one or more zeolites of the CHA structure type, are respectively present in the catalyst in a loading ranging from 0.1 to 5.0 $g/in^3$, preferably from 0.7 to 2.0 $g/in^3$, more preferably from 1.0 to 1.7 $g/in^3$, more preferably from 1.15 to 1.55 $g/in^3$, more preferably from 1.25 to 1.45 $g/in^3$, more preferably from 1.32 to 1.38 $g/in^3$, and even more preferably from 1.34 to 1.36 $g/in^3$.
12. The catalyst of any of embodiments 1 to 11, comprised in an exhaust gas treatment system comprising an internal combustion engine and an exhaust gas conduit in fluid communication with the internal combustion engine, wherein said catalyst is present in the exhaust gas conduit, and wherein the internal combustion engine is preferably a lean burn engine, and more preferably a diesel engine.
13. An exhaust gas treatment system comprising an internal combustion engine and an exhaust gas conduit in fluid communication with the internal combustion engine, wherein a catalyst according to any of embodiments 1 to 11 is present in the exhaust gas conduit, and wherein the internal combustion engine is preferably a lean burn engine, and more preferably a diesel engine.
14. The exhaust gas treatment system of embodiment 13, said exhaust gas treatment system further comprising an oxidation catalyst and/or a catalyzed soot filter (CSF), wherein the oxidation catalyst and/or the CSF are preferably located upstream from the catalyst according to any of embodiments 1 to 11, and wherein the oxidation catalyst is a diesel oxidation catalyst (DOC) in instances where the internal combustion engine is a diesel engine.
15. A process for the treatment of a gas stream comprising $NO_x$ comprising conducting said gas stream over and/or through a catalyst according to any one of embodiments 1 to 11, wherein the gas stream is preferably an exhaust gas stream, more preferably an exhaust gas stream resulting from an internal combustion engine, and even more preferably a diesel exhaust gas stream.
16. The process for the treatment of a gas stream comprising $NO_x$ according to embodiment 15, wherein the gas stream comprises ammonia and/or urea.
17. The process for the treatment of a gas stream comprising $NO_x$ according to embodiment 15 or 16, wherein prior to the contacting of the catalyst with the gas stream, the $NO_2$ content thereof is 80 wt.-% or less based on 100 wt.-% of $NO_x$, wherein preferably the $NO_2$ content is comprised in the range of from 5 to 70 wt.-%, more preferably of from 10 to 60 wt.-%, more preferably of from 15 to 55 wt.-%, and even more preferably of from 20 to 50 wt.-%.

DESCRIPTION

Figure 1:
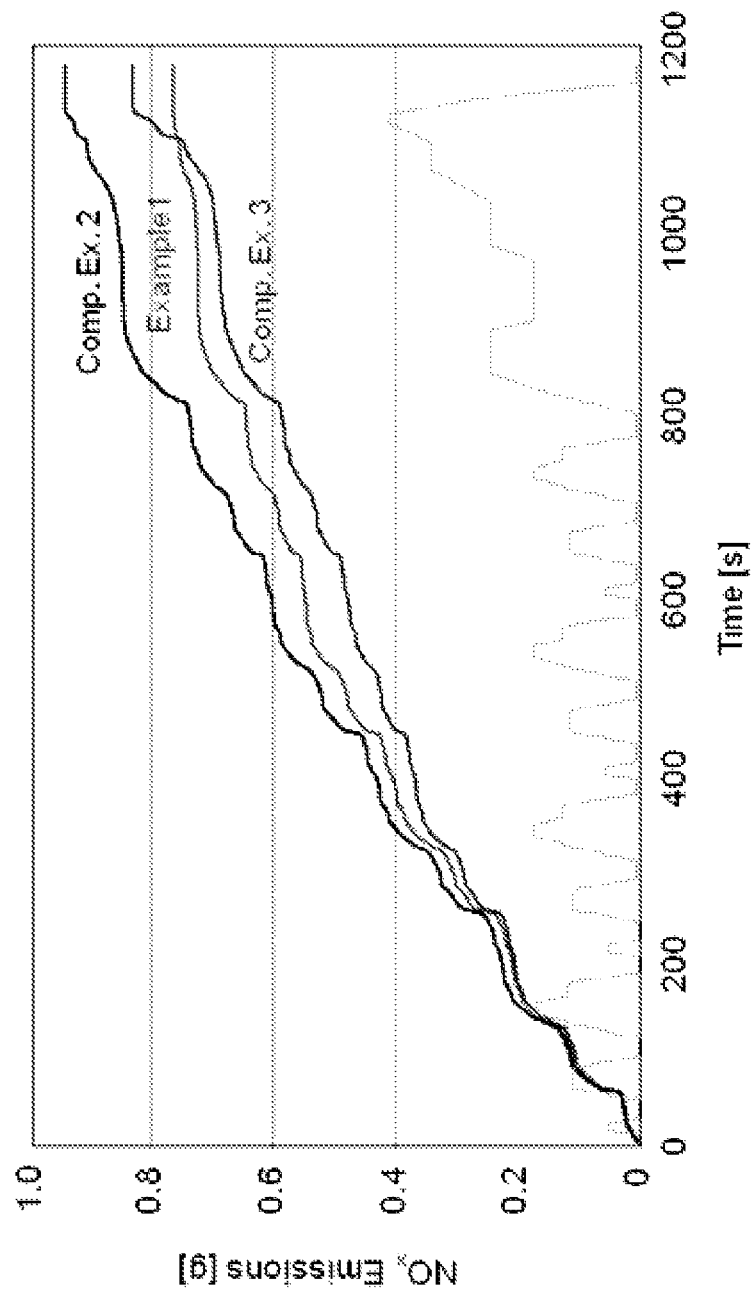
FIG. 1 is a graph displaying results from NEDC testing of the catalyst compositions according to Example 1 and Comparative Examples 2 and 3, respectively, wherein the testing period in seconds is plotted on the x-axis, and the $NO_x$ emissions in grams $NO_x$ is plotted on the y-axis, and wherein the background displays the legally prescribed course of NEDC testing over the time period in terms of the variation of the motor vehicle's speed as laid down in the European Union Directive 70/220/EEC.

In this respect, it has surprisingly been found that according to the present invention as outlined in the following, an improved catalyst may be provided. In particular, it has unexpectedly been found that a catalyst comprising zeolites of both the MFI and of the CHA structure type, wherein the MFI-type zeolites contain iron and the CHA-type zeolites contain copper, display clearly improved catalytic properties, in particular when used in SCR applications.

Thus, the present invention relates to a catalyst, preferably for use in selective catalytic reduction (SCR), said catalyst comprising
one or more zeolites of the MFI structure type, and
one or more zeolites of the CHA structure type,
wherein at least part of the one or more zeolites of the MFI structure type contain iron (Fe), and
wherein at least part of the one or more zeolites of the CHA structure type contain copper (Cu).

Within the meaning of the present invention, the term "selective catalytic reduction" abbreviated as "SCR" refers to any catalytic process involving the reaction of nitrogen oxides $NO_x$ with a reductant. In particular, SCR refers to reduction reactions, wherein $NO_x$ is transformed to a reduction product thereof, which is preferably $N_2$. Regarding the term "reductant", said term refers to any suitable reducing agent for the SCR process, wherein preferably ammonia and/or any ammonia precursor such as urea and/or ammonium carbamate is preferred, urea being preferably comprised in the ammonia precursor. Even more preferably, the term "reductant" refers to ammonia. The term "reductant" may, however, further include hydrocarbons and/or hydrocarbon derivatives such as oxygenated hydrocarbons, such as for example those which may be found in motor vehicle fuels and/or in motor vehicle exhaust gas, in particular in diesel fuel and/or diesel exhaust gas.

According to embodiments of the present invention, any conceivable zeolite of the MFI or of the CHA structure type may be used, respectively, provided that it displays the typical structural characteristics of that structure-type. With respect to the one or more zeolites of the MFI structure, these may for example comprise one or more zeolites selected from the group consisting of ZSM-5, [As—Si—O]-MFI, [Fe—Si—O]-MFI, [Ga—Si—O]-MFI, AMS-1B, AZ-1, Bor-C, Boralite C, Encilite, FZ-1, LZ-105, Monoclinic H-ZSM-5, Mutinaite, NU-4, NU-5, Silicalite, TS-1, TSZ, TSZ-III, TZ-01, USC-4, USI-108, ZBH, ZKQ-1B, ZMQ-TB, organic-free ZSM-5, and mixtures of two or more thereof. According to preferred embodiments of the present invention, the one or more zeolites of the MFI structure type include ZSM-5.

Concerning the one or more zeolites of the CHA structure, these may comprise one or more zeolites selected from the group consisting of chabazite, AlP, [Al—As—O]-CHA, [Co—Al—P—O]-CHA, [Mg—Al—P—O]-CHA, [Si—O]-CHA, [Zn—Al—P—O]-CHA, [Zn—As—O]-CHA, |Co| [Be—P—O]-CHA, |Li—Na|[Al—Si—O]-CHA O-34, CoAPO-44, CoAPO-47, DAF-5, Dehydrated Na-Chabazite, GaPO-34, K-Chabazite, LZ-218, Linde D, Linde R, MeAPO-47, MeAPSO-47, Ni(deta)$_2$-UT-6, Phi, SAPO-34, SAPO-47, SSZ-13, SSZ-62, UiO-21, Willhendersonite, ZK-14, ZYT-6, and mixtures of two or more thereof. According to preferred embodiments of the present invention, the one or more zeolites of the CHA structure type comprise one or more zeolites selected from the group consisting of chabazite, SSZ-13, LZ-218, Linde D, Linde R, Phi, ZK-14, and ZYT-6, and mixtures of two or more thereof, wherein more preferably, the one or more zeolites of the CHA structure type include chabazite.

According to embodiments of the present invention which are further preferred, the one or more zeolites of the MFI structure type include ZSM-5 and the one or more zeolites of the CHA structure type comprise one or more zeolites selected from the group consisting of chabazite, SSZ-13, LZ-218, Linde D, Linde R, Phi, ZK-14, and ZYT-6, and mixtures of two or more thereof, wherein even more preferably, the one or more zeolites of the MFI structure type include ZSM-5 and the one or more zeolites of the CHA structure type include chabazite. According to particularly preferred embodiments, the one or more zeolites of the MFI structure type is ZSM-5 and the one or more zeolites of the CHA structure type is chabazite According to an embodiment of the present invention, at least part of the one or more MFI-type zeolites contain iron and at least part of the one or more CHA-type zeolites contain copper.

With respect to the iron contained in at least part of the one or more MFI-type zeolites and the copper contained in at least part of the one or more CHA-type zeolites, said metals may respectively be contained therein in any conceivable fashion and in any conceivable state. Thus, according to the present invention, there is no particular limitation with respect to the oxidation state of iron and copper contained in the catalyst, nor with respect to the way in which they are contained in the respective type of zeolite. Preferably, however, iron and/or copper, and more preferably both iron and copper, respectively display a positive state of oxidation in the respective zeolite. Furthermore, iron and/or copper may be contained on the zeolite surface and/or within the porous structure of the respective zeolite framework. Alternatively or in addition to being supported on the zeolite surface and/or within the porous structure thereof, iron and/or copper may be included in the zeolite framework, for example by isomorphous substitution. According to preferred embodiments, the iron and/or copper, and more preferably both iron and copper, are supported on the respective zeolite surface and/or within the porous structure thereof, and even more preferably both on the respective zeolite surface and within the porous structure thereof. According to particularly preferred embodiments of the present invention, both iron and copper are respectively contained in at least part of the one or more zeolites of the MFI and CHA structure type in a positive oxidation state, wherein said iron and copper is supported on the surface of the respective zeolite, including being contained within the porous structure thereof.

The catalyst according to an embodiment of the present invention may comprise the one or more zeolites of the MFI structure type and the one or more zeolites of the CHA structure type in any conceivable weight ratio, wherein it is preferred that the weight ratio of the one or more zeolites of the MFI structure type relative to the one or more zeolites of the CHA structure type ranges from 1:10 to 10:1, more preferably from 1:5 to 5:1, more preferably form 1:2 to 2:1, more preferably from 0.7:1 to 1:0.7, more preferably from 0.8:1 to 1:0.8, and even more preferably from 0.9:1 to 1:0.9.

According to particularly preferred embodiments of the present invention, the weight ratio of the MFI-type zeolites to the CHA-type zeolites is approximately 1:1.

According to an embodiment of the present invention, it is preferred that the one or more zeolites of the MFI structure type and/or the one or more zeolites of the CHA structure type respectively comprise both Al and Si in their frameworks, wherein it is more preferred that both the zeolites of the MFI structure type and the zeolites of the CHA structure type respectively comprise both Al and Si in their frameworks. Thus, according to an embodiment of the present invention, it is preferred that one or more of the zeolites, and more preferably all of the zeolites, comprise both Al and Si in their respective zeolite frameworks.

With respect to embodiments of the present invention wherein one or more of the zeolites comprise both Al and Si in their respective frameworks, said zeolites may in principle display any possible ratio of Al to Si. In embodiments of the present invention wherein one or more zeolites of the MFI structure type comprise both Al and Si in their framework, it is however preferred that the molar ratio of silica to alumina (SAR) in the one or more zeolites of the MFI structure type ranges from 5 to 150, more preferably from 15 to 100, more preferably from 20 to 50, more preferably from 23 to 30, and even more preferably from 25 to 27. Furthermore, in embodiments of the present invention wherein one or more zeolites of the CHA structure type comprise both Al and Si in their framework, it is preferred that the SAR in the one or more zeolites of the CHA structure type ranges from 5 to 100, preferably from 10 to 70, more preferably from 20 to 55, more preferably from 25 to 35, and even more preferably from 28 to 32. According to particularly preferred embodiments of the present invention wherein one or more zeolites of both the MFI and the CHA structure type respectively comprise Al and Si in their framework, it is further preferred that the SAR in the one or more MFI-type zeolites ranges from 5 to 150, and the one or more CHA-type zeolites ranges from 5 to 100, more preferably that the SAR in the one or more MFI-type zeolites ranges from 15 to 100, and the one or more CHA-type zeolites ranges from 10 to 70, more preferably that the SAR in the one or more MFI-type zeolites ranges from 20 to 50, and the one or more CHA-type zeolites ranges from 20 to 55, more preferably that the SAR in the one or more MFI-type zeolites ranges from 23 to 30, and the one or more CHA-type zeolites ranges from 25 to 35, and even more preferably that the SAR in the one or more MFI-type zeolites ranges from 25 to 27, and the one or more CHA-type zeolites ranges from 28 to 32.

Regarding the iron contained in the MFI-type zeolites and the amount of copper contained in the CHA-type zeolites, there is no particular limitation according to the present invention as to their respective amounts. It is, however, preferred according to the present invention, that the amount of iron (Fe) in the one or more zeolites of the MFI structure type is comprised in the range of from 0.1 to 15 wt.-% based on the weight of said one or more zeolites of the MFI structure type, wherein more preferably the amount of Fe ranges from 0.5 to 10 wt.-%, more preferably from 1.0 to 7.0 wt.-%, more preferably from 2.5 to 5.5 wt.-%, more preferably from 3.5 to 4.2 wt.-%, and even more preferably from 3.7 to 4.0 wt.-%. Furthermore, it is preferred according to the present invention that the amount of copper (Cu) in the one or more zeolites of the CHA structure type ranges from 0.05 to 15 wt.-% based on the weight of said one or more zeolites of the CHA structure type, wherein more preferably the amount of Cu ranges from 0.1 to 10 wt.-%, more preferably from 0.5 to 5.0 wt.-%, more preferably from 1.0 to 4.0 wt.-%, more preferably from 1.6 to 3.4 wt.-%, and even more preferably from 1.8 to 3.2 wt.-%. According to particularly preferred embodiments of the present invention, the amount of iron in the one or more MFI-type zeolites ranges from 0.1 to 15 wt.-%, and the amount of copper in the one or more CHA-type zeolites ranges from 0.1 to 10 wt.-%, wherein more preferably the amount of iron in the one or more MFI-type zeolites ranges from 1.0 to 7.0 wt.-%, and the amount of copper in the one or more CHA-type zeolites ranges from 0.5 to 5.0 wt.-%, more preferably the amount of iron in the one or more MFI-type zeolites ranges from 2.5 to 5.5 wt.-%, and the amount of copper in the one or more CHA-type zeolites ranges from 1.0 to 4.0 wt.-%, more preferably the amount of iron in the one or more MFI-type zeolites ranges from 3.5 to 4.2 wt.-%, and the amount of copper in the one or more CHA-type zeolites ranges from 1.6 to 3.4 wt.-%, and even more preferably, the amount of iron in the one or more MFI-type zeolites ranges from 3.7 to 4.0 wt.-%, and the amount of copper in the one or more CHA-type zeolites ranges from 1.8 to 3.2 wt.-%.

According to the present invention, the catalyst may be provided in any conceivable form, such as by way of example in the form of a powder, a granulate, or a monolith. In this respect, it is particularly preferred that the catalyst further comprises a substrate, onto which the one or more zeolites are provided. In general, the substrate can be made from materials commonly known in the art. For this purpose, porous materials are preferably used as the substrate material, in particular ceramic and ceramic-like materials such as cordierite, α-alumina, an aluminosilicate, cordierite-alumina, silicon carbide, aluminum titanate, silicon nitride, zirconia, mullite, zircon, zircon mullite, zircon silicate, sillimanite, a magnesium silicate, petalite, spodumene, alumina-silica-magnesia and zirconium silicate, as well as porous refractory metals and oxides thereof. According to the present invention, "refractory metal" refers to one or more metals selected from the group consisting of Ti, Zr, Hf, V, Nb, Ta, Cr, Mo, W, and Re. The substrate may also be formed of ceramic fiber composite materials. According to the present invention, the substrate is preferably formed from cordierite, silicon carbide, and/or from aluminum titanate, and even more preferably from cordierite and/or silicon carbide.

The substrates useful for the catalysts of embodiments of the present invention may also be metallic in nature and be composed of one or more metals or metal alloys. The metallic substrates may be employed in various shapes such as corrugated sheet or monolithic form. Suitable metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt.-% of the alloy, e.g., 10-25 wt.-% of chromium, 3-8 wt.-% of aluminum and up to 20 wt.-% of nickel. The alloys may also contain small or trace amounts of one or more other metals such as manganese, copper, vanadium, titanium and the like. The surface or the metal substrates may be oxidized at high temperatures, e.g., 1000° C. and higher, to improve the resistance to corrosion of the alloys by forming an oxide layer on the surfaces the substrates.

Furthermore, the substrate according to the present invention may be of any conceivable shape, provided that it allows for the fluid contact with at least a portion of the respective one or more zeolites of the MFI and CHA structure types present thereon. Preferably, the substrate is a monolith, wherein more preferably the monolith is a flow-through monolith. Suitable substrates include any of those materials typically used for preparing catalysts, and will usually comprise a ceramic or metal honeycomb structure. Accordingly, the monolithic substrate contains fine, parallel gas flow passages extending from an inlet to an outlet face of the substrate, such that passages are open to fluid flow (referred to as honeycomb flow through substrates). The passages, which are essentially straight paths from their fluid inlet to their fluid outlet, are defined by walls onto which the one or more zeolites of the MFI and CHA structure types are respectively disposed, so that the gases flowing through the passages may contact them. The flow passages of the monolithic substrate are thin-walled channels, which can be of any suitable cross-sectional shape and size such as trapezoidal, rectangular, square, sinusoidal, hexagonal, oval, or circular. Such structures may contain up to 900 gas inlet openings (i.e., cells) per square inch of cross section, wherein according to the present invention structures preferably have from 50 to 600 openings per square inch, more preferably from 300 to 500, and even more preferably from 350 to 400.

Thus, according to a preferred embodiment of the present invention, the catalyst comprises a substrate which is a monolith, and preferably a honeycomb substrate.

According to further preferred embodiments of the present invention, the substrate is a wall flow monolith. For these embodiments, the substrate is preferably a honeycomb wall flow filter, wound or packed fiber filter, open-cell foam, or sintered metal filter, wherein wall flow filters are particularly preferred. As for the equally preferred flow through monoliths, useful wall flow substrates have a plurality of fine, substantially parallel gas flow passages extending along the longitudinal axis of the substrate. Typically, each passage is blocked at one end of the substrate body, with alternate passages blocked at opposite end-faces. Particularly preferred wall flow substrates for use in the present invention include thin porous walled honeycomb monoliths, through which a fluid stream may pass without causing too great an increase in back pressure or pressure across the catalyst. Ceramic wall flow substrates used in the present invention are preferably formed of a material having a porosity of at least 40%, preferably from 40 to 70%, and having a mean pore size of at least 5 microns, preferably from 5 to 30 microns. Further preferred are substrates having a porosity of at least 50% and having a mean pore size of at least 10 microns.

Thus, according to the present invention, the substrate preferably comprised in the catalyst is preferably selected from the group consisting of flow-through substrates and wall-flow substrates, more preferably from the group consisting of cordierite flow-through substrates and wall-flow substrates, and silicon carbide flow-through substrates and wall-flow substrates.

In general, according to embodiments of the present invention which further comprise a substrate, the zeolites may be provided thereon in any conceivable fashion, wherein they are preferably provided thereon in the form of one or more layers which are preferably washcoat layers. In preferred embodiments of the present invention, wherein the catalyst comprises a substrate and two or more layers provided thereon, the zeolites may be provided in said two or more layers in any possible manner. Accordingly, the present invention includes, for example, such preferred embodiments wherein the zeolites are contained in only a single of the two or more layers, as well as embodiments wherein the zeolite is contained in more than one of the two or more layers. Preferably, however, the zeolites are contained in a single layer, irrespective of the number of layers present on the substrate.

Thus, according to preferred embodiments of the present invention wherein the catalyst comprises a substrate, it is further preferred that the catalyst comprises one or more layers, preferably washcoat layers, provided on the substrate, the zeolites being contained in one single layer or two or more separate layers, wherein preferably the zeolites are contained in one single layer.

In further embodiments of the present invention comprising a substrate and two or more layers provided thereon, wherein the zeolites are contained in more than one of said layers, there is no particular limitation as to the distribution of the one or more zeolites of the MFI and the CHA structure type among said more than one layers which comprise said zeolites. Thus, it is principally possible according to the present invention, that, for example, the MFI- and CHA-type zeolites are respectively contained in each of the layers which contain zeolites, or that, alternatively, only part of the layers containing zeolites contain both MFI- and CHA-type zeolites. Furthermore, it is possible according to said further embodiments of the present invention that no single layer contains both MFI- and CHA-type zeolites, said zeolites being accordingly contained in separate layers of the catalyst. According to the present invention it is, however, preferred that at least one of the layers in such embodiments contains both MFI- and CHA-type zeolites, wherein it is even more preferred that each of the two or more layers of said embodiments containing the zeolites also contains both the MFI- and CHA-type zeolites.

In principle, the one or more zeolites of the MFI and of the CHA structure type may be respectively present in the catalyst in any conceivable amount, provided that an improved catalyst according to the present invention may be obtained. Thus, either the one or more zeolites of the MFI structure type, or the one or more zeolites of the CHA structure type, or both the one or more zeolites of the MFI structure type and the one or more zeolites of the CHA structure type, may respectively be present in the catalyst in a loading ranging from 0.1 to 5.0 g/in$^3$, wherein their loading preferably ranges from 0.7 to 2.0 g/in$^3$, more preferably from 1.0 to 1.7 g/in$^3$, more preferably from 1.15 to 1.55 g/in$^3$, more preferably from 1.25 to 1.45 g/in$^3$, more preferably from 1.32 to 1.38 g/in$^3$, and even more preferably from 1.34 to 1.36 g/in$^3$. In particular, the respective loadings of the MFI- and CHA-type zeolites may be independent from one another, in the sense that the preferred loading ranges may apply either to the MFI- or to the CHA-type zeolites, wherein the loading of the one or more zeolites belonging to the other structure type is respectively not particularly limited, and may therefore be present in any loading, or may be limited to a different range of loadings. Thus, the present invention also comprises embodiments wherein, for example, the loading of the MFI-type zeolites ranges from 0.1 to 5.0 g/in$^3$, and the loading of the CHA-type zeolites ranges from 1.34 to 1.36 g/in$^3$, or embodiments wherein, for example, the loading of the MFI-type zeolites ranges from 0.7 to 2.0 g/in$^3$, and the loading of the CHA-type zeolites ranges from 1.32 to 1.38 g/in$^3$, or embodiments wherein, for example, the loading of the MFI-type zeolites ranges from 1.0 to 1.7 g/in$^3$, and the loading of the CHA-type zeolites ranges from 1.25 to 1.45 g/in$^3$, or embodiments wherein, for example, the loading of the MFI-type zeolites ranges from 1.15 to 1.55 g/in$^3$, and the loading of the CHA-type zeolites ranges from 1.15 to 1.55 g/in$^3$, or embodiments wherein, for example, the loading of the MFI-type zeolites ranges from 1.25 to 1.45 g/in$^3$, and the loading of the CHA-type zeolites ranges from 1.0 to 1.7 g/in$^3$, or embodiments wherein, for example, the loading of the MFI-type zeolites ranges from 1.32 to 1.38 g/in$^3$, and the loading of the CHA-type zeolites ranges from 0.7 to 2.0 g/in$^3$, or embodiments wherein, for example, the loading of the MFI-type zeolites ranges from 1.34 to 1.36 g/in$^3$, and the loading of the CHA-type zeolites ranges from 0.1 to 5.0 g/in$^3$.

In addition to the above-mentioned catalyst, the present invention also relates to a treatment system for an exhaust gas stream. In particular, the treatment system of the present invention comprises an internal combustion engine which is preferably a lean burn engine, and even more preferably a diesel engine. According to the present invention, it is however also possible to use a lean burn gasoline engine in said treatment system.

Furthermore, the treatment system according to an embodiment of the present invention comprises an exhaust gas conduit which is in fluid communication with the internal combustion engine. In this respect, any conceivable conduit may be used, provided that it is capable of conducting exhaust gas from an internal combustion engine, and may sufficiently resist the temperatures and the chemical species encountered in the exhaust gas of an internal combustion engine, in particular of a lean burn engine such as a diesel engine. Within the meaning of the present invention, the fluid communication provided between the exhaust gas conduit and the internal combustion engine signifies that the treatment system allows for the constant passage of exhaust gas from the engine to the conduit.

According to the exhaust gas treatment system of an embodiment of the present invention, the catalyst is present in the exhaust gas conduit. In general, the catalyst may be provided in the exhaust gas conduit in any conceivable fashion, provided that it is present within the exhaust gas conduit in the sense that it may be contacted by the exhaust gas passing through said conduit. Preferably, the catalyst is provided in the exhaust gas conduit on a substrate as outlined in the present application, and in particular on a honeycomb substrate, which is preferably either a flow-through or a wall-flow honeycomb substrate.

Thus, an embodiment of the present invention also relates to an exhaust gas treatment system comprising an internal combustion engine and an exhaust gas conduit in fluid communication with the internal combustion engine, wherein the catalyst according to the present invention is present in the exhaust gas conduit, and wherein the internal combustion engine is preferably a lean burn engine, and more preferably a diesel engine.

In this respect and independently thereof, the present invention also relates to embodiments wherein the inventive catalyst is comprised in an exhaust gas treatment system comprising an internal combustion engine and an exhaust gas conduit in fluid communication with the internal combustion engine, wherein said catalyst is present in the exhaust gas conduit, and wherein the internal combustion engine is preferably a lean burn engine, and more preferably a diesel engine.

According to preferred embodiments of the present invention, the exhaust gas treatment system further comprises a means of introducing a reductant into the exhaust gas stream, wherein said means is located upstream from the inventive MFI/CHA-zeolite catalyst. In particular, it is preferred that a means of introducing ammonia and/or urea into the exhaust gas conduit is provided. In this respect, any means known to the skilled person may be provided, in particular those commonly applied to exhaust gas treatment systems operating with active SCR methods necessitating the direct introduction of said reductants. According to particularly preferred embodiments, the reductant which preferably comprises ammonia and/or urea is introduced by the means of an injection nozzle provided in the exhaust gas conduit upstream from the inventive catalyst.

Within the meaning of the present invention, the exhaust gas treatment system may suitably further comprise any further components for the effective treatment of an exhaust gas. In particular, said system preferably further comprises an oxidation catalyst or a catalyzed soot filter (CSF) or both an oxidation catalyst and a CSF. According to said embodiments, the oxidation catalyst and/or the CSF are also present within the exhaust gas conduit.

In the present invention, any suitable CSF can be used, provided that it may effectively oxidize soot which may be contained in the exhaust gas. To this effect, the CSF of the present invention preferably comprises a substrate coated with a washcoat layer containing one or more catalysts for burning off trapped soot and/or oxidizing exhaust gas stream emissions. In general, the soot burning catalyst can be any known catalyst for combustion of soot. For example, the CSF can be coated with a one or more high surface area refractory oxides (such as e.g. alumina, silica, silica alumina, zirconia, and zirconia alumina) and/or with an oxidation catalyst (such as e.g. a ceria-zirconia) for the combustion of unburned hydrocarbons and to some degree particulate matter. However, preferably the soot burning catalyst is an oxidation catalyst comprising one or more precious metal catalysts, said one or more precious metal catalysts preferably comprising one or more metals selected from the group consisting of platinum, palladium, and rhodium.

Regarding the oxidation catalyst preferably comprised in the exhaust gas treatment system instead of or in addition to a CSF, any oxidation catalyst may be used to this effect which is suitable for oxidizing unburned hydrocarbons, CO, and/or $NO_x$ comprised in the exhaust gas. In particular, oxidation catalysts are preferred which comprise one or more precious metal catalysts, and more preferably one or more precious metals selected from the group consisting of platinum, palladium, and rhodium. According to particularly preferred embodiments of the present invention, wherein the internal combustion engine of the exhaust gas treatment system is a diesel engine, the oxidation catalyst is preferably a diesel oxidation catalyst. In particular, within the meaning of the present invention, a "diesel oxidation catalyst" refers to any oxidation catalyst which is particularly well adapted to the oxidation of diesel exhaust gas, in particular with respect to the temperatures and to the composition of diesel exhaust gas encountered in the treatment thereof.

According to particularly preferred embodiments, the exhaust gas treatment system further comprises a CSF, and even more preferably both a CSF and an oxidation catalyst. Even more preferably, the exhaust gas treatment system further comprises a CSF and a diesel oxidation catalyst.

In principle, in embodiments of the exhaust gas treatment system which further comprise an oxidation catalyst and/or a CSF, said further components may be present in the exhaust gas conduit in any order and at any emplacement therein, provided that the effective treatment of an exhaust gas may be provided. In particular, however, the presence and/or order and/or location of said further components may depend on the type, on the state, in particular with respect to the temperature and pressure thereof, and on the average composition of the exhaust gas which is treated. Thus depending on the application of the exhaust gas treatment system, the present invention includes preferred embodiments wherein the oxidation catalyst and/or the CSF are located upstream or downstream from the inventive MFI/CHA-zeolite catalyst, as well as preferred embodiments comprising both an oxidation catalyst and a CSF, wherein the oxidation catalyst is located upstream and the CSF downstream thereof, or wherein, vice versa, the CSF is located upstream, and the oxidation catalyst downstream thereof. According to particularly preferred embodiments of the present invention, the oxidation catalyst and/or the CSF are located upstream from the inventive MFI/CHA-zeolite catalyst, wherein even more preferably, the exhaust gas treatment system comprises both an oxidation catalyst and a CSF upstream from the inventive MFI/CHA-zeolite catalyst. Within the meaning of the present invention, "upstream" and "downstream" relates to the direction of flow of the exhaust gas through the exhaust gas conduit in fluid communication with the internal combustion engine.

Thus, an embodiment of the present invention also relates to an exhaust gas treatment system as defined in the foregoing, said exhaust gas treatment system further comprising an oxidation catalyst and/or a catalyzed soot filter (CSF), wherein the oxidation catalyst and/or the CSF are preferably located upstream from the inventive MFI/CHA-zeolite catalyst, and wherein the oxidation catalyst is a diesel oxidation catalyst (DOC) in instances where the internal combustion engine is a diesel engine.

Furthermore, as outlined in the foregoing, the exhaust gas treatment system preferably further includes a means of introducing a reductant into the exhaust gas conduit, said means being located upstream from the inventive MFI/CHA-zeolite catalyst. In particular, said means enables the introduction of a reductant comprising ammonia and/or urea into the exhaust gas conduit. Accordingly, the present invention also relates to an exhaust gas treatment system wherein in addition to or instead of further comprising an oxidation catalyst and/or a catalyzed soot filter (CSF) respectively preferably located upstream from the inventive MFI/CHA-zeolite catalyst, the oxidation catalyst being a diesel oxidation catalyst (DOC) in instances where the internal combustion engine is a diesel engine, said system further comprises a means of introducing a reductant preferably comprising ammonia and/or urea into the exhaust gas conduit, said means being located upstream of the inventive MFI/CHA-zeolite catalyst.

According to further preferred embodiments of the present invention, the exhaust gas treatment system further comprises an ammonia slip catalyst located downstream of the MFI/CHA-zeolite catalyst for oxidizing excess ammonia and/or urea which has not reacted in the SCR. Regarding the preferred ammonia slip catalyst, said catalyst may be provided in the exhaust gas conduit in any manner commonly known in the art, provided that it may effectively oxidize said excess ammonia and/or urea. In particular, said preferred embodiments involve an exhaust gas treatment systems according to the present invention which include a means of introducing a reductant into the exhaust gas conduit as defined in the foregoing.

In addition to a catalyst and to an exhaust gas treatment system comprising said catalyst, the present invention further concerns a process for the treatment of a gas stream comprising $NO_x$. In general, in the process of the present invention, any suitable gas stream comprising $NO_x$ may be employed, provided that its state and composition are both suited for being treated when contacted with a MFI/CHA-zeolite catalyst according to the present invention, wherein preferably said treatment at least in part involves the selective catalytic reduction of at least part of the $NO_x$ contained in said gas. For this purpose, the gas stream used in the inventive process preferably contains at least one reductant, which is preferably ammonia and/or any ammonia precursor such as urea and/or ammonium carbamate, urea being preferably comprised in the ammonia precursor. According to further embodiments of the inventive process, however, the gas stream used may also contain hydrocarbons and/or hydrocarbon derivatives such as oxygenated hydrocarbons, such as for example those which may be found in motor vehicle fuels and/or in motor vehicle exhaust gas, in particular in diesel fuel and/or exhaust gas. Said further reductants may be contained in the gas treated in the inventive process either in addition to ammonia, or, according to further embodiments, may also be contained therein instead of ammonia. According to the present invention, it is however particularly preferred that the gas comprises ammonia and/or urea as a reducing agent for the treatment of exhaust gas emissions, in particular via SCR.

Thus, an embodiment of the present invention also relates to a process for the treatment of a gas stream comprising $NO_x$ as defined in the present application, wherein the gas stream comprises ammonia and/or urea.

Regarding the content of reductant in the gas stream, said reductant preferably comprising ammonia and/or urea, there is no particular limitation in this respect, provided that at least part of the $NO_x$ in said gas may be reduced by SCR when contacting the MFI/CHA-zeolite catalyst of the present invention. It is however preferred, that said content does not considerably derive from the amount of reductant necessary for the maximal conversion of $NO_x$ by the catalyst. In this respect, the maximal conversion reflects the maximum amount of $NO_x$ which may be converted by SCR at a given time point in the inventive process, i.e. relative to the actual state and condition of both the catalyst and the gas to be treated upon contacting thereof, and in particular depending on the content of the reductant and, preferably, depending on the amount of ammonia and/or urea contained therein. Accordingly, the maximal conversion of $NO_x$ directly reflects the maximum amount of reductant, and preferably of ammonia and/or urea, which may react with $NO_x$ in the SCR process at a given time point.

According to preferred embodiments of the present invention, the gas stream used in the inventive process is preferably an exhaust gas stream comprising $NO_x$. In this respect, there is no particular limitation as to the process which leads to such an exhaust gas stream, provided that it is suited for treatment with the MFI/CHA-zeolite catalyst according to the present invention, or may be processed to a gas stream suited for treatment with such a catalyst. According to the inventive process it is further preferred that the exhaust gas stream is an exhaust gas stream resulting from an internal combustion engine, and even more preferably from a lean burn engine. According to particularly preferred embodiments, the exhaust gas stream is a diesel engine exhaust gas stream.

In the process according to an embodiment of the present invention, the gas stream is contacted with the inventive MFI/CHA-zeolite catalyst for treatment thereof, wherein said contacting is achieved by either conducting the gas stream over the catalyst, or conducting the gas stream through the catalyst. Said contacting may, however, also be achieved by conducting the gas stream both over and through the inventive catalyst. According to preferred embodiments, the gas stream is either conducted over the catalyst, wherein the catalyst preferably comprises a flow-through substrate for this purpose, or the gas stream is conducted through the catalyst, wherein in this case the catalyst preferably comprises a wall-flow substrate. When using a wall-flow substrate, however, there are instances wherein, depending on the process conditions and the specific form and dimensions of the catalyst, at least a portion of the gas stream may also be conducted over the catalyst. According to particularly preferred embodiments of the inventive process, the catalyst used in the inventive process either comprises a wall-flow honeycomb substrate or a flow-through honeycomb substrate.

Thus, an embodiment of the present invention also relates to a process for the treatment of a gas stream comprising $NO_x$ comprising conducting said gas stream over and/or through an MFI/CHA-zeolite catalyst according to the present invention, wherein the gas stream is preferably an exhaust gas stream, more preferably an exhaust gas stream resulting from an internal combustion engine, and even more preferably a diesel exhaust gas stream.

In the inventive process, there is no particular limitation as to the amount of $NO_x$ contained in the gas stream, wherein preferably, the amount thereof in the gas streams used in the inventive process does not exceed 10 wt.-% based on the total weight of the exhaust gas, and more preferably does not exceed 1 wt.-%, more preferably 0.5 wt.-%, more preferably 0.1 wt.-%, more preferably 0.05 wt-. %, more preferably 0.03 wt-. %, and even more preferably does not exceed 0.01 wt.-%.

Regarding the specific composition of the $NO_x$ fraction contained in the gas stream treated in the inventive process, there is no limitation as to the type or to the content of specific nitrous oxide gases $NO_x$ contained therein. According to specific embodiments of the present invention, it is however preferred that the $NO_2$-content relative to the total $NO_x$-content is 80 wt.-% or less based on 100 wt.-% of $NO_x$, wherein more preferably, the $NO_2$ content is comprised in the range of from 5 to 70 wt.-%, more preferably of from 10 to 60 wt.-%, more preferably of from 15 to 55 wt.-%, and even more preferably of from 20 to 50 wt.-%.

In general, the composition of the gas stream used in the inventive process as defined in the present application refers to the gas stream prior to its use in the inventive process, and in particular prior to the contacting thereof with the catalyst. Preferably, however, said composition refers to the gas stream's composition immediately prior to contacting the catalyst, i.e. immediately before treatment thereof begins by catalyzed chemical conversion thereof.

Thus, an embodiment of the present invention also relates to a process for the treatment of a gas stream comprising $NO_x$ as defined in the present application, wherein prior to the contacting of the catalyst with the gas stream, the $NO_2$ content thereof is 80 wt.-% or less based on 100 wt.-% of $NO_x$, wherein preferably the $NO_2$ content is comprised in the range of from 5 to 70 wt.-%, more preferably of from 10 to 60 wt.-%, more preferably of from 15 to 55 wt.-%, and even more preferably of from 20 to 50 wt.-%.

The catalyst according to the present invention can be readily prepared by processes well known in the prior art. A representative process is set forth below. As used herein, the term "washcoat" has its usual meaning in the art of a thin, adherent coating of a catalytic or other material applied to a substrate carrier material, such as a honeycomb-type carrier member, which is preferably sufficiently porous to permit the passage there through of the gas stream being treated.

The several zeolite components of the catalyst may be applied to the substrate as mixtures of one or more components in sequential steps in a manner which will be readily apparent to those skilled in the art of catalyst manufacture. A typical method of manufacturing the catalyst of the present invention is to respectively provide the at least one zeolite of the MFI structure type, and the at least one further zeolite of the CHA structure type as a coating or washcoat layer on the walls of a particularly preferred flow-through or wall-flow honeycomb substrate. According to certain preferred embodiments of the present invention, the zeolites are provided in a single washcoat on the substrate.

The catalyst according to the present invention is however preferably prepared by further using at least one binder, wherein any conceivable binder used in the art of catalyst manufacture, and in particular in the art of automotive SCR catalyst manufacture, may be used. In this respect, a silica-alumina binder is for example preferably used for the preparation of the inventive catalyst, wherein said binder may be provided together with one or more of the zeolite components, and is preferably provided together with the zeolite components in one or more coatings on a substrate, more preferably in one or more washcoat layers.

For preparing the inventive catalyst, the components of one or possibly more washcoat layers may respectively be processed to a slurry, preferably to an aqueous slurry. The substrate may then be sequentially immersed into the respective slurries for applying the individual washcoats, after which excess slurry is removed to provide a thin coating of the two or more slurries on the walls of the substrate. The coated substrate is then dried and preferably calcined to provide an adherent coating of the respective component to the walls of the substrate. Thus, for example, after providing a first washcoat layer on the substrate, and preferably drying and/or calcining the coated substrate, the resulting coated substrate may then be immersed into a further slurry to form a second washcoat layer deposited over the first washcoat layer. Again, the substrate may then be dried and/or calcined and eventually coated with a third washcoat, which again may subsequently be dried and/or calcined to provide a finished catalyst in accordance with one embodiment of the present invention. Regarding the steps of drying, washing, and calcining of the catalyst coated in this fashion, these may be respectively performed in the manner well known in the art of catalyst manufacture, in particular regarding the solvents and/or solutions used for washing the coated catalyst, as well as regarding the temperature, duration, and the atmosphere employed in the steps of drying and calcination, respectively. Concerning the step of calcination, any possible temperature may be used therein, provided that the process leads to the desired transformations in the catalyst without causing any notable or substantial deterioration of the catalysts stability, in particular with regard to its use in SCR. Thus, in certain cases, the temperature of calcination will not exceed 700° C., preferably 650° C., more preferably 600° C., and even more preferably will not exceed 550° C. Thus, calcination may for example be conducted at a temperature comprised in the range of from 500° C. to 650° C., preferably 550° C. to 600° C., more preferably 570° C. to 590° C., more preferably, and even more preferably at a temperature comprised in the range of from 575° C. to 585° C.

When preparing the inventive catalyst in the above-mentioned manner, it is however preferred that no washing of the washcoat layers is performed after the application and optional drying thereof.

Accordingly, the catalyst of the present invention may be prepared according to a process comprising (a) providing at least one zeolite of the MFI structure type, and at least one further zeolite selected from zeolites of the CHA structure type, wherein at least part of the one or more zeolites of the MFI structure type contain iron, and wherein at least part of the one or more further zeolites of the CHA structure type contain copper;

(b) preparing one or more washcoat compositions respectively comprising one or more of the zeolites;

(c) applying the one or more washcoat compositions in one more respective layers onto the substrate, wherein a step of drying is optionally conducted after the respective application of one or more of the individual layers;

(d) optionally washing and/or drying the coated substrate, wherein the coated substrate is preferably not washed; and (e) optionally subjecting the coated substrate to a calcination process.

Embodiments of the present invention may be better understood by the following non-limiting examples.

EXAMPLES

Example 1

A catalyst composition was prepared comprising 1.35 g/in$^3$ of a zeolite of the CHA structure type, said CHA-type zeolite having a silica to alumina ratio (SAR) of approximately 30 and containing 3 wt.-% of copper based on the total weight of the CHA-type zeolite, 1.35 g/in$^3$ of a zeolite of the MFI structure type, said MFI-type zeolite having a silica to alumina ratio of approximately 26 and containing 3.8 wt.-% of iron based on the total weight of the MFI-type zeolite, and 0.3 g/in$^3$ of a silica-alumina binder.

Comparative Example 2

A catalyst composition was prepared comprising 1.9 g/in$^3$ of a zeolite of the CHA structure type, said CHA-type zeolite having a silica to alumina ratio (SAR) of approximately 30 and containing 3 wt.-% of copper based on the total weight of the CHA-type zeolite, and 0.1 g/in$^3$ of a zirconyl binder.

Comparative Example 3

A catalyst composition was prepared comprising 1.35 g/in$^3$ of a zeolite of the BEA structure type, said BEA-type zeolite having a silica to alumina ratio (SAR) of approximately 40 and containing 1.3 wt.-% of iron based on the total weight of the BEA-type zeolite, 1.35 g/in$^3$ of a zeolite of the MFI structure type, said MFI-type zeolite having a silica to alumina ratio of approximately 26 and containing 3.8 wt.-% of iron based on the total weight of the MFI-type zeolite, and 0.3 g/in$^3$ of a silica-alumina binder.

SCR Performance Testing

DeNO$_x$ Performance of the SCR Catalysts were evaluated in transient conditions using the New European Driving Cycle, also referred to as the MVEG (Motor Vehicle Emissions Group) cycle. In particular, testing conditions were such, that the NO$_x$ fraction of the exhaust gas stream contained less than 30 wt.-% of NO$_2$ based on the total NO$_x$-content.

For testing, the catalyst compositions according to Examples 1 and Comparative Examples 2 and 3 were respectively coated onto a 5.66"×5.66"×6" flow-through honeycomb substrate having a volume of 2.5 L, a cell density of 400 cells per square inch, and a wall thickness of approximately 100 μm (4 mil). The catalyst samples prepared in this fashion were then tested in an exhaust gas treatment system with a diesel oxidation catalyst (DOC) and a catalyzed soot filter (CSF) respectively located upstream from the tested catalyst.

Figure 2:
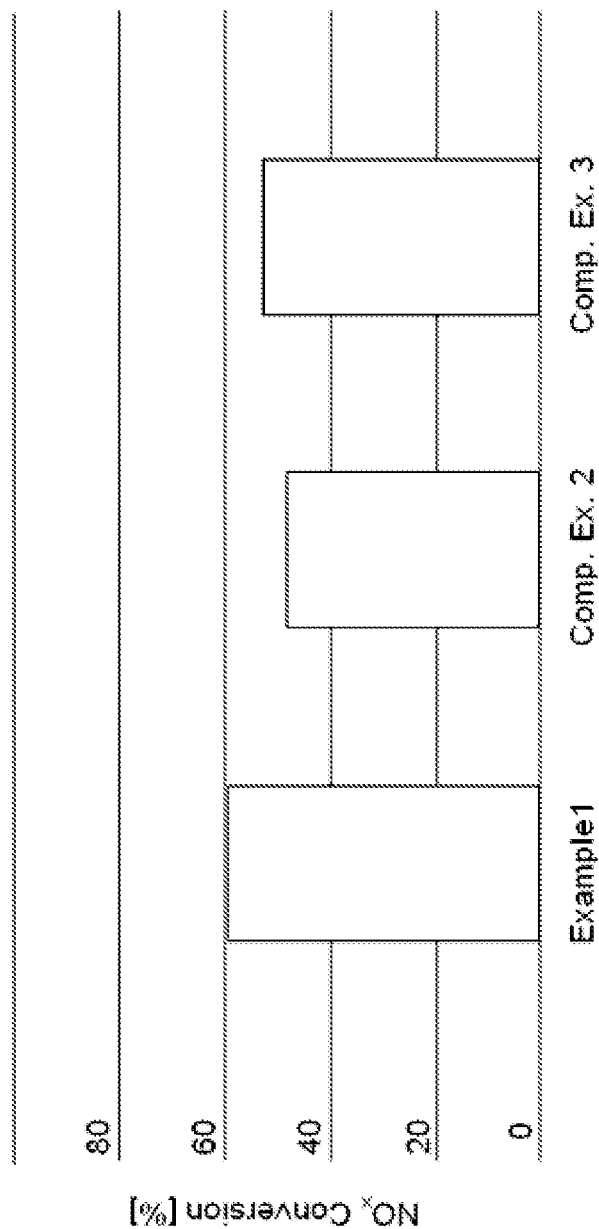
FIG. 2 is a graph displaying the total $NO_x$ conversion in % achieved for samples according to Example 1 and Comparative Examples 2 and 3, respectively, in NEDC testing.

The results from the NEDC catalyst testing are shown in FIGS. 1 and 2, respectively. Thus, as may be taken from said figures, the inventive catalyst according to Example 1 which contains a combination of CHA- and MFI-type zeolites displays a clearly improved performance compared to the catalyst sample of Comparative Example 2 which only contains CHA-type zeolite. In particular, as may be taken from FIG. 2, the inventive catalyst leads to a considerably higher level of conversion of the $NO_x$ emissions compared to the catalyst of Comparative Example 2. Furthermore, when considering the results displayed in FIG. 1, wherein the level of $NO_x$ emissions is plotted as a function of the NEDC testing period, the inventive catalyst shows a superior conversion performance compared to Comparative Example 2 both during the period from 0 to 800 s corresponding to the old European driving cycle (ECE-15), as well as during the testing period from 800 to 1200s, corresponding to the extra-urban part of the driving cycle involving higher space velocity and higher $NO_x$ mass flow.

Compared to testing results for Comparative Example 3 in FIG. 1, which as opposed to the specific MFI/CHA-zeolite mixture of the inventive example contains a mixture of iron-exchanged zeolites or the MFI and BEA structure types, the inventive catalyst shows a somewhat poorer performance during the low temperature and moderate space velocity portion of the NEDC testing (cf. FIG. 1). Said initial performance is, however, well compensated by an outstanding conversion rate at higher space velocities and higher $NO_x$ mass flow. Thus, as may be taken from the overall performance results displayed in FIG. 2, the inventive catalyst is also superior to a catalyst according to Comparative Example 3. In particular, although the performance of a catalyst according to Comparative Example 3 is somewhat better adapted to the representative urban driving conditions encounter in the 0 to 800s time period of the NEDC, the inventive catalyst is clearly superior over the entire cycle due to the outstanding performance in the extra-urban cycle section between 800 and 1200s. Accordingly, when considering the overall catalyst performance, the inventive catalyst is better adapted to the actual exhaust gas emission pattern of a vehicle over time, when considering the actual driving behavior of the average passenger car reflected in NEDC testing.

Consequently, the catalyst according to the present invention shows a clearly superior performance in SCR compared to a catalyst according to the prior art represent by Comparative Example 2, and, furthermore, is particularly well adapted to the actual driving conditions encountered in motor vehicle use, as reflected in NEDC testing. In particular, these excellent results may be attributed to the use of a specific combination of zeolite materials as defined by the catalyst of the present invention.

The invention claimed is:

1. A catalyst for use in selective catalytic reduction (SCR), said catalyst comprising:
    one or more zeolites of the MFI structure type, and
    one or more zeolites of the CHA structure type,
    wherein at least part of the one or more zeolites of the MFI structure type contain iron (Fe),
    wherein at least part of the one or more zeolites of the CHA structure type contain copper (Cu),
    wherein the weight ratio of the one or more zeolites of the MFI structure type relative to the one or more zeolites of the CHA structure type ranges from 1:2 to 2:1,
    wherein the molar ratio of silica to alumina (SAR) in the one or more zeolites of the MFI structure type ranges from 20 to 50,
    wherein the molar ratio of silica to alumina (SAR) in the one or more zeolites of the CHA structure type ranges from 20 to 55,
    wherein the amount of Fe in the one or more zeolites of the MFI structure type ranges from 2.5 to 5.5 wt-% based on the weight of said one or more zeolites, and
    wherein the amount of Cu in the one or more zeolites of the CHA structure type ranges from 1.0 to 1.0 wt-% based on the weight of said one or more zeolites.

2. The catalyst of claim 1, wherein said catalyst further comprises a honeycomb substrate onto which the one or more zeolites are provided.

3. The catalyst of claim 2, wherein the substrate is selected from the group consisting of flow-through substrates and wall-flow substrates.

4. The catalyst of claim 2, wherein the catalyst comprises one or more washcoat layers provided on the substrate, the zeolites being contained in one single layer.

5. The catalyst of claim 2, wherein either the one or more zeolites of the MFI structure type, or the one or more zeolites of the CHA structure type, or both the one or more zeolites of the MFI structure type and the one or more zeolites of the CHA structure type, are respectively present in the catalyst in a loading ranging from 0.1 to 5.0 $g/in^3$.

6. The catalyst of claim 1, wherein the molar ratio of silica to alumina (SAR) in the one or more zeolites of the MFI structure type ranges from 23 to 30.

7. The catalyst of claim 1, wherein the molar ratio of silica to alumina (SAR) in the one or more zeolites of the CHA structure type ranges from 25 to 35.

8. The catalyst of claim 1, wherein the amount of Cu in the one or more zeolites of the CHA structure type ranges from 1.6 to 3.4 wt-% based on the weight of said one or more zeolites.

9. The catalyst of claim 2, wherein either the one or more zeolites of the MFI structure type, or the one or more zeolites of the CHA structure type, or both the one or more zeolites of the MFI structure type and the one or more zeolites of the CHA structure type, are respectively present in the catalyst in a loading ranging from 1.25 to 1.45 $g/in^3$.

10. An exhaust gas system comprising the catalyst of claim 1, an internal combustion engine and an exhaust gas conduit in fluid communication with the internal combustion engine, wherein said catalyst is present in the exhaust gas conduit, and wherein the internal combustion engine is a lean burn engine.

11. An exhaust gas treatment system comprising an internal combustion engine and an exhaust gas conduit in fluid communication with the internal combustion engine, wherein a catalyst according to claim 1 is present in the exhaust gas conduit, and wherein the internal combustion engine is a diesel engine.

12. The exhaust gas treatment system of claim 11, said exhaust gas treatment system further comprising an oxidation catalyst and/or a catalyzed soot filter (CSF), wherein the oxidation catalyst and/or the CSF are located upstream from the catalyst according to claim 1, and wherein the oxidation catalyst is a diesel oxidation catalyst (DOC).

13. A process for the treatment of a gas stream comprising $NO_x$ comprising conducting said gas stream over a catalyst according to claim 1, wherein the gas stream is an exhaust gas stream or a diesel exhaust gas stream.

14. The process for the treatment of a gas stream comprising $NO_x$ according to claim 13, wherein the gas stream comprises ammonia and/or urea.

15. The process for the treatment of a gas stream comprising NO according to claim 13, wherein prior to the contacting of the catalyst with the gas stream, the $NO_2$ content thereof is 80 wt-% or less based on 100 wt.-% of $NO_x$.

* * * * *